United States Patent
Dunham et al.

(10) Patent No.: US 9,440,695 B2
(45) Date of Patent: Sep. 13, 2016

(54) SEAT INCLUDING INFLATABLE BLADDER AND ELECTRICALLY POWERED AIR COMPRESSOR

(71) Applicant: Ford Global Technologies, LLC, Dearborn, MI (US)

(72) Inventors: Scott H. Dunham, Redford, MI (US); Kenneth Alan Stoner, Northville, MI (US); Anthony Ligi, Chelsea, MI (US); Bernard Gerard Marchetti, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 13 days.

(21) Appl. No.: 14/326,838

(22) Filed: Jul. 9, 2014

(65) Prior Publication Data

US 2016/0009327 A1    Jan. 14, 2016

(51) Int. Cl.
*B62J 1/10* (2006.01)
*B62J 1/08* (2006.01)

(52) U.S. Cl.
CPC .... *B62J 1/10* (2013.01); *B62J 1/08* (2013.01)

(58) Field of Classification Search
CPC ..................................... B62J 1/10; B62J 1/08
USPC ................. 297/200, 199; 280/274, 281.1
See application file for complete search history.

(56) References Cited

U.S. PATENT DOCUMENTS

| | | | | |
|---|---|---|---|---|
| 4,611,851 A | * | 9/1986 | Noyes | B62J 1/26 297/199 |
| 5,016,894 A | * | 5/1991 | Alioto | B60C 23/105 152/415 |
| 5,280,993 A | * | 1/1994 | Hsh | B62J 1/26 297/199 |
| 5,356,205 A | * | 10/1994 | Calvert | B62J 1/002 280/288.4 |
| 5,419,612 A | | 5/1995 | Rassekhi | |
| 5,524,961 A | | 6/1996 | Howard | |
| 5,558,395 A | * | 9/1996 | Huang | A43B 13/203 297/199 |
| 5,636,896 A | * | 6/1997 | Howard | B62J 1/26 297/199 |
| 5,738,406 A | | 4/1998 | Deus | |
| 5,975,629 A | * | 11/1999 | Lorbiecki | B60N 2/4415 137/625.46 |
| 6,050,585 A | * | 4/2000 | Rai | B62K 19/36 280/220 |
| 6,979,013 B2 | | 12/2005 | Chen | |
| 7,261,371 B2 | * | 8/2007 | Thunissen | B60N 2/56 297/180.14 |
| 7,448,676 B2 | | 11/2008 | Wyner et al. | |
| 7,455,355 B1 | * | 11/2008 | Kohlman | B62J 1/26 297/200 |
| 8,297,696 B2 | | 10/2012 | Chuang | |
| 8,641,069 B2 | * | 2/2014 | Haager | 280/201 |
| 9,073,593 B1 | * | 7/2015 | Kuhl | B62J 1/26 |

(Continued)

FOREIGN PATENT DOCUMENTS

CN    2825435 Y    10/2006
EP    0941196 A1    9/1999

(Continued)

OTHER PUBLICATIONS

GB Search Report dated Nov. 27, 2015 (3 pages).

*Primary Examiner* — Timothy J Brindley
(74) *Attorney, Agent, or Firm* — Frank A. MacKenzie; Bejin Bieneman PLC

(57) ABSTRACT

A seat for a vehicle, such as a bicycle, includes a stem for coupling to the bicycle. The seat includes a saddle supported by the stem and an inflatable bladder supported by the saddle. An electrically powered air compressor is supported by the stem and is in fluid communication with the bladder for inflating the bladder.

20 Claims, 3 Drawing Sheets

(56) References Cited

U.S. PATENT DOCUMENTS

| | | | |
|---|---|---|---|
| 2006/0140801 A1* | 6/2006 | Hepfner | B62J 1/08 417/572 |
| 2007/0145795 A1 | 6/2007 | Wyner et al. | |
| 2008/0007098 A1* | 1/2008 | Girard | B62J 1/08 297/195.1 |
| 2009/0096184 A1* | 4/2009 | Krudenscheidt | B60C 23/105 280/201 |
| 2014/0300150 A1* | 10/2014 | Stuckey | B62J 1/10 297/199 |
| 2015/0191208 A1* | 7/2015 | Hsu | B62J 1/06 403/322.3 |

FOREIGN PATENT DOCUMENTS

| | | |
|---|---|---|
| EP | 2176117 B1 | 3/2011 |
| WO | WO 98/25810 | 6/1998 |

* cited by examiner

US 9,440,695 B2

SEAT INCLUDING INFLATABLE BLADDER AND ELECTRICALLY POWERED AIR COMPRESSOR

BACKGROUND

Vehicles such as bicycles, mopeds, scooters, and motorcycles, lawn mowers, exercise bikes, tractors, etc., include seats that the rider sits upon during operation. Such vehicles include a seat post and the seat includes a stem for coupling to the seat post. The seat includes a saddle supported on the stem for supporting a rider in a seated position.

The saddle may be cushioned to absorb shock during operation of the vehicle to improve the comfort of the rider. For example, the saddle may include foam or gel inserts.

Riders may desire various levels of saddle stiffness. For example, various riders have different personal preferences regarding the stiffness of the saddle. Further, variations on use of the saddle may change the stiffness preferences of the rider. Such variations include changes in clothing, the addition/removal of a backpack, and distance and time of travel.

Foam or gel inserts are not typically adjustable to adjust stiffness. As such, various saddles may be interchangeably used to adjust the stiffness, or the stiffness of a single seat may be adjusted by replacing the foam or gel inserts with other inserts having a different stiffness.

However, riders may also have a desire to change the stiffness of the saddle during operation of the vehicle. For example, during operation, a rider may wish to change the stiffness of the saddle based on differences in terrain and ergonomic issues based on distance and time of travel. As such, there remains an opportunity to design a seat that may be adjusted to change the stiffness, including at times when the vehicle is being operated.

DETAILED DESCRIPTION

Figure 1:
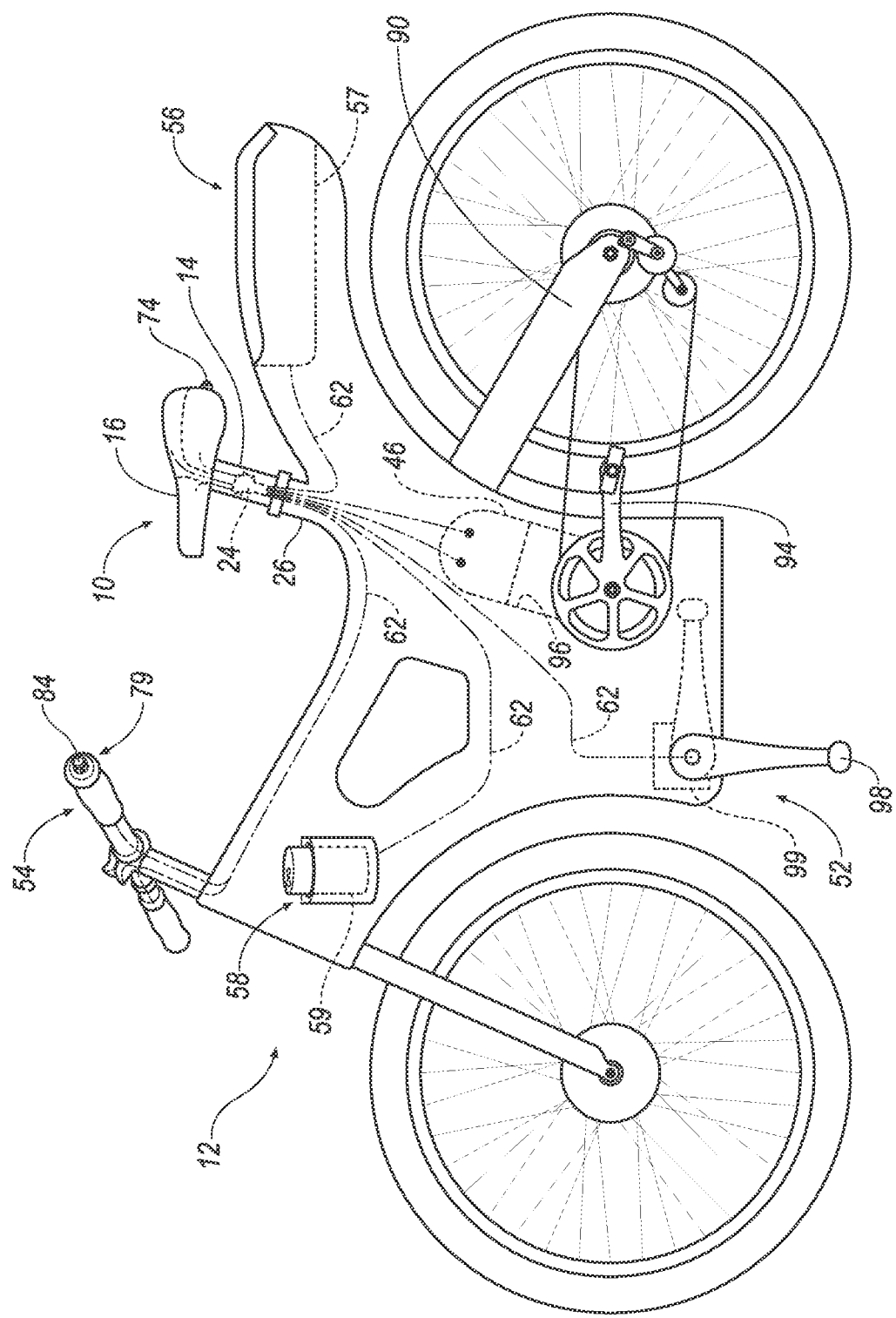
FIG. 1 is a side view of a bicycle including a seat having a stem and an electrically powered air compressor supported by the stem.
Figure 2:
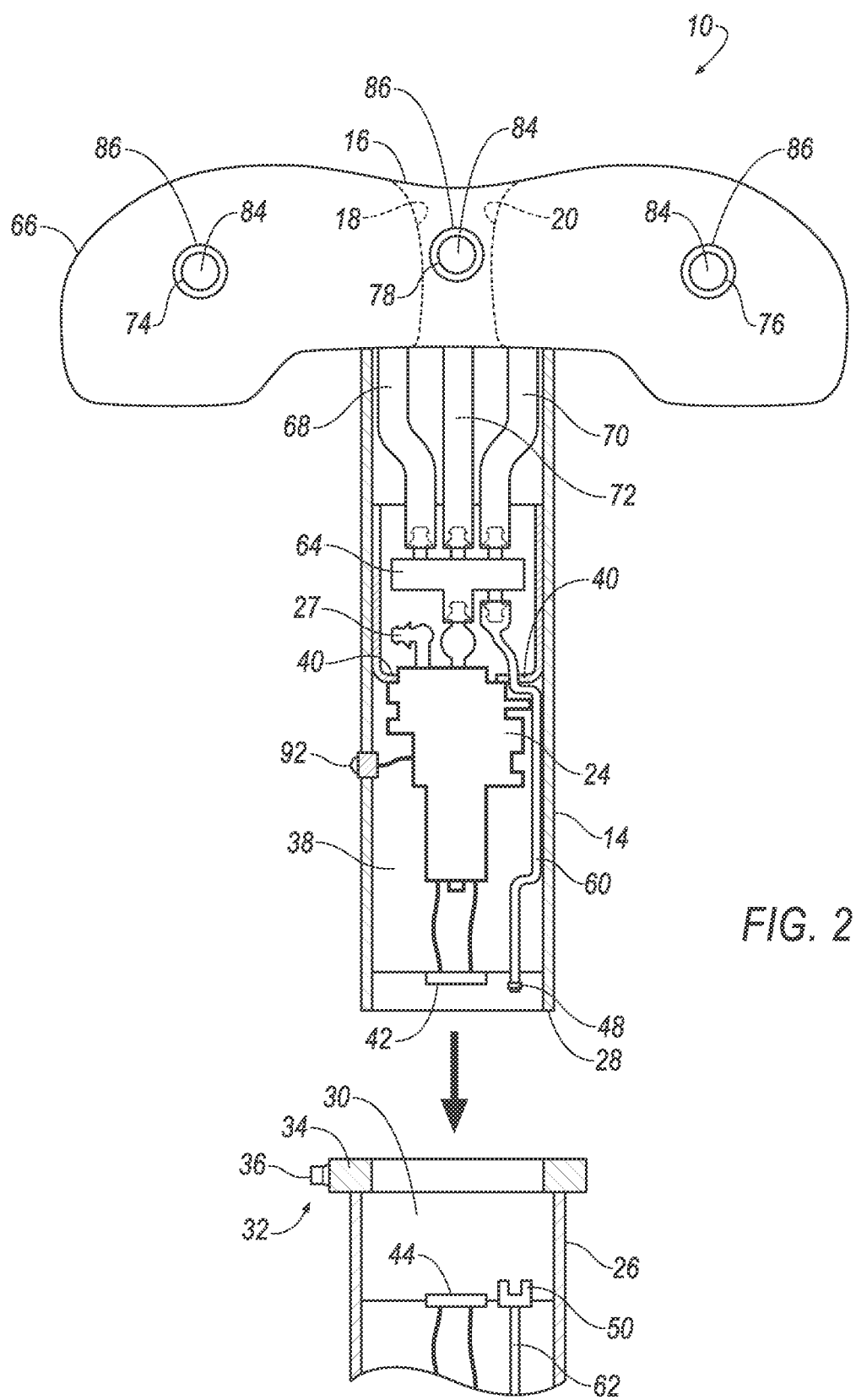
FIG. 2 is a rear view of the seat with the stem in cross-section.

With reference to the Figures, wherein like numerals indicate like parts throughout the several views, a seat 10 is generally shown. The seat 10 may be coupled to a vehicle such as a bicycle 12, a moped (not shown), a scooter (not shown), a motorcycle (not shown), a lawn mower (not shown), an exercise bike (not shown), a tractor (not shown), etc. With reference to FIG. 2, the seat 10 includes a stem 14 for connecting to the vehicle, e.g., the bicycle 12 as shown in FIG. 1. A saddle 16 is supported by the stem 14. An inflatable bladder 18, 20, 22 is supported by the saddle 16. An electrically powered air compressor 24 is supported by the stem 14 and is in fluid communication with the bladder for inflating the inflatable bladder 18, 20, 22.

By being supported by the stem 14, the air compressor 24 may be conveniently located while avoiding or limiting unwanted increase in dimensions of the seat 10. The air compressor 24 can inflate the inflatable bladder 18, 20, 22 to adjust the stiffness of the seat 10 and/or to adjust the contours of the seat 10 according to a rider's desire, as set forth further below. As set forth further below, the seat 10 may include any suitable number of inflatable bladders 18, 20, 22, i.e., one or more bladders.

With continued reference to FIG. 2, the stem 14 is configured to engage the seat post 26. For example, one of the stem 14 and the seat post 26 may define a distal end 28 and the other of the stem 14 and the seat post 26 may define a bore 30 receiving the distal end 28. As shown in FIG. 2, for example, the stem 14 presents the distal end 28 spaced from the saddle 16 and the seat post 26 defines the bore 30.

The stem 14 and the seat post 26 may be configured to removably engage each other. As such, the seat 10 may be removed from the seat post 26 and carried with the rider away from the bicycle 12. In other words, the seat 14 is modular, i.e., the seat 10, including the air compressor 24, can be removed from the seat post 26 as a unit. The seat 10 may be stored separately from the bicycle 12 to avoid theft of the seat 10, which may otherwise be a theft target due in part to the air compressor 24 supported by the stem 14. The distal end 28 and the bore 30 may be, for example, dimensioned such that the distal end 28 is slidably received in the bore 30 and is firmly seated 10 in the bore 30 when received in the bore 30.

The stem 14 and/or the seat post 26 may include a lock 32 for selectively locking and unlocking the stem 14 relative to the seat post 26. The lock 32 may be of the quick-disconnect type. The lock 32 may be a clamp supported on the seat post 26. The clamp may include a split ring 34 and a lever 36 for clamping and unclamping the split ring 34 relative to the stem 14. Alternatively, the lock 32 may be of any suitable type for selectively locking and unlocking the stem 14 relative to the seat post 26. The lock 32 may be used to adjust the height of the seat 10 relative to the seat post 26.

The stem 14 houses the air compressor 24. In other words, the air compressor 24 may be disposed in the stem 14. For example, with reference to FIG. 2, the stem 14 defines a cavity 38 and the air compressor 24 is disposed in the cavity 38. The air compressor 24 may be retained in the cavity 38 in any suitable manner. For example, the stem 14 may include fingers 40 or other engagement features (not shown) that engage the air compressor 24.

The stem 14 and the seat post 26 each support an electrical connector 42 configured to engage a corresponding electrical connector 44 supported by the seat post 26 when the stem 14 engages the seat post 26. The stem 14 electrical connectors 42, 44 electrically connect to each other when the stem 14 is engaged with the seat post 26 to connect the air compressor 24 to a battery 46, as set forth further below. The electrical connector 42 supported by the stem 14 may be disposed at the distal end 28 of the stem 14.

The stem 14 and the seat post 26 each support an air connector 48, 50 configured to fluidly couple the electrically powered air compressor 24 with additional components of the bicycle 12 including, for example, a pneumatically actuated kickstand 52, inflatable handles 54, an inflatable storage compartment 56, an inflatable beverage holder 58, etc. The connectors 48, 50 are configured to supply compressed air through the connectors 48, 50 to the additional components of the bicycle 12. For example, with reference to FIG. 2, one of the connectors 48, 50 may be a male member and the other of the connectors 48, 50 may be a female member that receives the male member. As shown in FIG. 2, for example, the male member is supported on the stem 14 and the female member is supported on the seat post 26. The male member and/or the female member may include locking features for releasably locking together.

With continued reference to FIG. 2, tubing 60 may extend from the connector 48 for connection with the air compressor 24 and tubing 62 may extend from the connector 50 into the seat post 26 for connection with the additional components. The tubing 60 in the stem 14 may be coupled to a manifold 64 supported in the stem 14, as set forth further below. Shut-off valves (not shown), flow control valves (not shown), etc., may be disposed between the air compressor 24 and the bladders 18, 20, 22 and/or between the air compressor 24 and the additional components of the bicycle 12.

Figure 3:
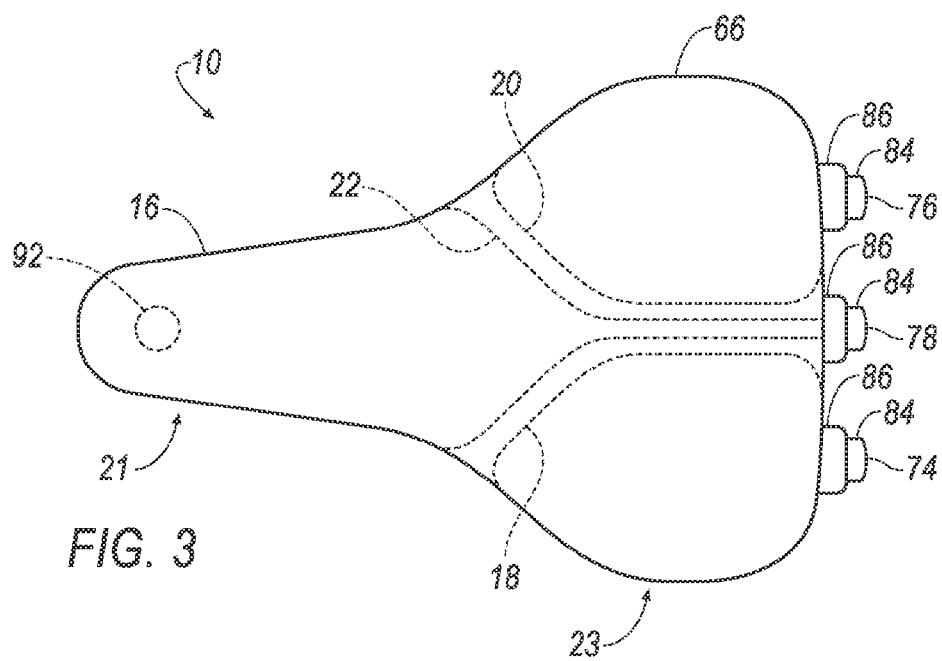
FIG. 3 is a top view of the seat with inflatable bladders shown in hidden lines.
Figure 4:
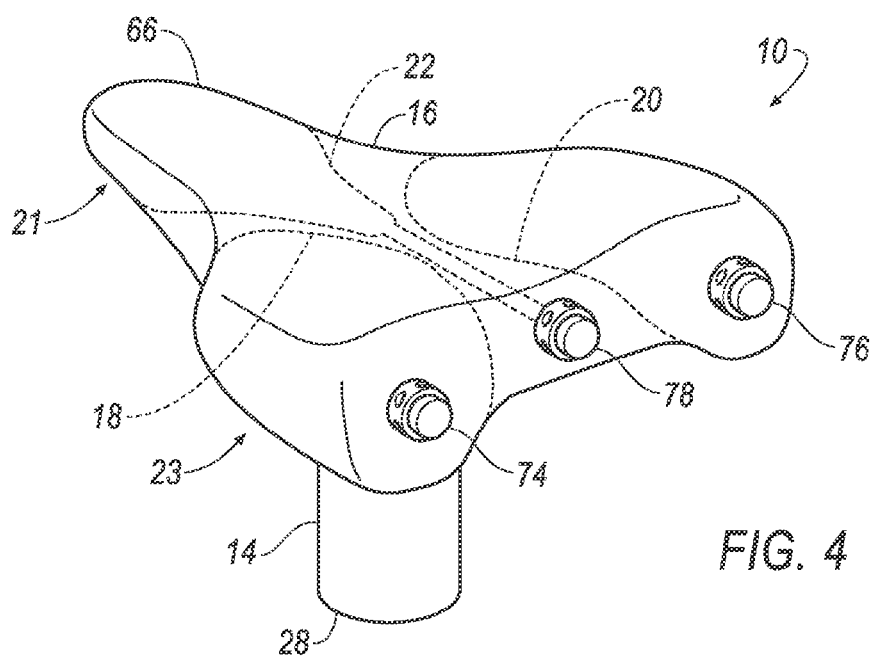
FIG. 4 is a perspective view of the seat.

As set forth above, the seat 10 may include any suitable number of bladders. For example, as shown in FIGS. 3 and 4, the seat 10 may include a first inflatable bladder 18, a second inflatable bladder 20 separate from the first inflatable bladder 18, and a third inflatable bladder 22 separate from the first inflatable bladder 18 and the second inflatable bladder 20. The terms "first," "second," and "third" are used herein merely for identifiers and do not indicate any order or importance.

The saddle 16 may include a frame (not shown) and a cover 66 disposed over the frame. The cover 66 may be any suitable material such as vinyl, leather, etc. Foam (not shown) or other suitable material may be disposed between the frame and the cover 66. The saddle 16 may be configured such that the rider straddles the saddle 16 with a nose 21 that extends between the legs of the rider and a platform 23, that may be wider than the nose 21, for supporting the rider. For example, in the configuration shown in the Figures, the first bladder 18 and the second bladder 20 are disposed in the platform 23 and the third bladder 22 is disposed in the nose 21.

Each bladder may 18, 20, 22 be formed of any suitable material that is flexible and air impermeable. Each bladder 18, 20, 22 may be disposed beneath the cover 66, as shown in FIGS. 2-4, such that inflation and deflation of the bladders 18, 20, 22 affects the stiffness of the saddle 16. Alternatively, each bladder 18, 20, 22 may be disposed on an exterior of the cover 66 or any other suitable location in which inflation and deflation affects the stiffness of the seat 10.

Each of the first inflatable bladder 18, second inflatable bladder 20, and third inflatable bladder 22 may be independently coupled to the air compressor 24. The manifold 64, as shown in FIG. 2, may be disposed between the air compressor 24 and each of the first inflatable bladder 18, second inflatable bladder 20, and third inflatable bladder 22. Tubing 68, 70, 72 may connect the manifold 64 to the first inflatable bladder 18, second inflatable bladder 20, and third inflatable bladder 22. The tubing 68, 70, 72 provides fluid communication between the air compressor 24 and the first inflatable bladder 18, second inflatable bladder 20, and third inflatable bladder 22. The air compressor 24 includes an air inlet 27 air intake.

Figure 5:
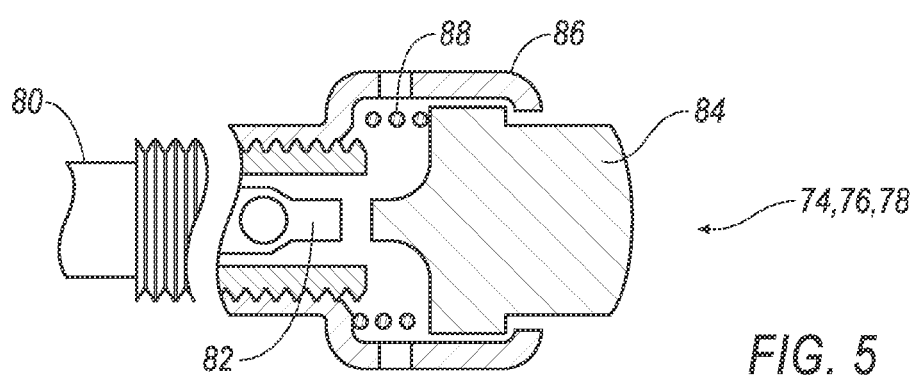
FIG. 5 is a partial cross-sectional view of a valve of the seat.

With reference to FIGS. 4 and 5, valves 74, 76, 78 are in communication with each bladder 18, 20, 22 for selectively releasing air from the bladders 18, 20, 22. In particular, a first valve 74 is in communication with the first inflatable bladder 18, a second valve 76 is in communication with the second inflatable bladder 20, and a third valve 78 is in communication with the third inflatable bladder 22. The first valve 74, second valve 76, and third valve 78 are independently operable for releasing air independently from the first bladder 18, the second inflatable bladder 20, and the third inflatable bladder 22, respectively.

The first valve 74, second valve 76, and third valve 78 may be disposed on a rear portion of the saddle 16. In such a configuration, the valves 74, 76, 78 are easily accessible by the rider while riding the bicycle 12 for deflating the bladders while riding the bicycle 12. The valves 74, 76, 78 may alternatively be disposed in any suitable location and orientation.

With reference to FIG. 5, each valve 74, 76, 78 may include a valve stem 80 and a spring loaded core 82 in the valve stem 80 that is moveable between an open position allowing air flow through the valve stem 80 and a closed position preventing air flow through the valve stem 80. The core 82 is spring biased by a spring (not shown) toward the closed position. The valve stem 80 and the spring loaded core 82 may be of the type of a Schrader valve assembly. Alternatively, the valve 74, 76, 78 may be of any suitable type.

The valves 74, 76, 78 may be manually operable. A plunger 84 is moveably supported adjacent the valve stem 80 for moving the core 82 from the closed position to the open position. For example, the valve 74, 76, 78 may include a housing 86 supported on a valve stem 80 with the plunger 84 housed in the housing 86. A spring 88 is disposed between the housing 86 and the plunger 84 for urging the plunger 84 away from the core 82. The plunger 84 may be moved toward the core 82 against the bias of the spring 88 to contact the plunger 84 with the core 82 and move the core 82 from the closed position to the open position.

In the alternative to, or in addition to manual operation, the valves 74, 76, 78 may be automatically operable. For example, the valves 74, 76, 78 may electrically controlled. In such an embodiment, the bicycle 12 may include a control system (not shown) for controlling the valves 74, 76, 78 and/or the air compressor 24. The control system may include a user interface for operating the control system and may include one or more pressure sensors for monitoring pressure of the bladders 18, 20, 22. The control system may, for example, store rider preferred inflation settings and the user may select a preferred inflation setting with use of the user interface.

The air compressor 24 may be, for example, a scroll compressor. As one example, the air compressor 24 may be of the type commercially available from Air Squared, Inc. of Broomfield, Colo., USA. One example, is the P5F7 model available from Air Squared, Inc. This model may be 35 mm-square by 78 mm long. The air compressor 24 may alternatively be of any suitable type.

As set forth above, the air compressor 24 may be electrically powered. For example, the air compressor 24 may be a 12V DC air compressor 24. In such a configuration, the air compressor 24 may be electrically coupled to the battery 46 to be powered by the battery 46.

The battery 46 may be of any suitable type and size. For example, as set forth above, the battery 46 may be a 12V battery 46. The battery 46 may be supported by a frame 90 of the bicycle 12.

A switch 92 may be in communication with the air compressor 24 for selectively powering the air compressor 24. In other words, the switch 92 may be operated to connect and disconnect the air compressor 24 from the battery 46. The switch 92 may be of any type such as a toggle switch, push button switch, slide switch, etc. The switch 92 may be supported on an underside of the saddle 16, as shown in FIG. 3. Alternatively, or in addition, the switch 92 may be supported on the stem 14 of the seat 10. In these two configurations, the switch 92 is easily accessible by the rider while riding the bicycle 12 for inflating the bladders while riding the bicycle 12.

In operation, the rider may inflate the first inflatable bladder 18, second inflatable bladder 20, and third inflatable bladder 22 by moving the switch 92 to an on position. When the bladders 18, 20, 22 are inflated to a desired pressure, the rider moves the switch 92 to an off position. The rider is then able to independently adjust the pressure of any of the first inflatable bladder 18, second inflatable bladder 20, and third inflatable bladder 22 by opening any of the first valve 74, second valve 76, and third valve 78, respectively. Using the switch 92 and the valves 74, 76, 78, the rider may independently inflate each bladder 18, 20, 22 to a desired pressure. The rider may, for example adjust the pressure of each bladder 18, 20, 22 to adjust the stiffness of the seat 10 to a desired stiffness. While riding the bicycle 12, the rider may operate the switch 92 and/or any of the valves 74, 76, 78 to adjust the inflation, and thus the stiffness, based changing comfort levels, changing terrain, etc.

With reference to FIG. 1, the bicycle 12 may be optionally manually powered or electrically powered. For example, the bicycle 12 may be manually powered by pedaling pedals 94 of the bicycle 12. The bicycle 12 may be electrically powered by operating a motor 96 that is powered by the battery 46.

With reference to FIG. 1, as set forth above, the bicycle 12 may include a pneumatically actuated kickstand 52. The kickstand 52 may include a leg 98 pivotally coupled to the frame of the bicycle 12 and a pneumatic motor 99 in selective communication with the air compressor 24 for moving pivoting the leg 98 relative to the frame 90. The pneumatic motor 99 may be supported by the frame 90. Tubing 62 may connect the pneumatic motor 99 to the connector 48. A switch (not shown) or other controller may be supported on the bicycle 12 for operating the pneumatic motor 99.

With continued reference to FIG. 1, as set forth above, the bicycle 12 may include inflatable handles 54. The inflatable handles 54 may be inflated to a selected pressure based on the comfort level of the rider. Tubing 62 may connect the inflatable handles 54 to the connector 48. A switch (not shown) or other controller may be supported on the bicycle 12 for inflating the inflatable handles 54. The inflatable handles 54 may include a valve 79 for deflating the inflatable handle 54. The valve 79 on the inflatable handles 54 may have the same construction as the valve 74, 76, 78 of FIG. 5. For example, the plunger 84 is identified in the valve 79 on the inflatable handles 54 in FIG. 1.

With continued reference to FIG. 1, as set forth above, the bicycle 12 may include an inflatable storage compartment 56. The inflatable storage compartment 56 may include, for example, a flexible lining 57 that may be selectively inflated/deflated. The storage compartment 56 may, for example, be used as a cooler and may be flexible lining 57, when inflated, may provide insulation. Tubing 62 may connect the inflatable storage compartment 56 to the connector 48. A switch (not shown) or other controller may be supported on the bicycle 12 for inflating/deflating the inflatable storage compartment 56.

With continued reference to FIG. 1, as set forth above, the bicycle 12 may include an inflatable beverage holder 58. The inflatable beverage holder 58 may include, for example, a flexible lining 59 that may be selectively inflated/deflated. The flexible lining 59, when inflated, may provide insulation. Tubing 62 may connect the inflatable beverage holder 58 to the connector 48. A switch (not shown) or other controller may be supported on the bicycle 12 for inflating/deflating the inflatable beverage holder 58.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. A seat comprising:
a stem;
a saddle supported by the stem;
an inflatable bladder supported by the saddle;
an electrically powered air compressor disposed in the stem and in fluid communication with the bladder for inflating the bladder;
wherein the stem is configured to engage a seat post of a bicycle, the stem supporting an electrical connector in communication with the electrically powered air compressor, the electrical connector configured to engage a corresponding electrical connector supported by the seat post when the stem engages the seat post for connecting the electrically powered air compressor to a battery of the bicycle.

2. The seat as set forth in claim 1 wherein the stem defines a cavity and the electrically powered air compressor is disposed in the cavity.

3. The seat as set forth in claim 1 wherein the stem presents a distal end spaced from the saddle, the electrical connector being disposed at the distal end.

4. The seat as set forth in claim 1 wherein the stem is configured to engage a seat post of a bicycle, the stem supporting a connector configured to fluidly couple the electrically powered air compressor with a corresponding connector supported by the seat post for supplying compressed air through the connector to additional components of the bicycle.

5. The seat as set forth in claim 1 wherein the electrically powered air compressor is a scroll compressor.

6. The seat as set forth in claim 1 further comprising a valve in communication with the bladder for selectively releasing air from the bladder.

7. The seat as set forth in claim 1 further comprising a second bladder separate from the first bladder and in fluid communication with the electrically powered air compressor.

8. The seat as set forth in claim 7 further comprising a valve in fluid communication with the bladder and a second valve in fluid communication with the second bladder for releasing air independently from the bladder and the second bladder.

9. A bicycle comprising:
a frame including a seat post;
a battery on the frame below the seat post;
a seat including a stem configured to engage the seat post, a saddle supported by the stem, and an inflatable bladder supported by the saddle;
the seat including an electrically powered air compressor supported by the stem, the electrically powered air compressor being electrically coupled to the battery and in fluid communication with the bladder for inflating the bladder.

10. The bicycle as set forth in claim 9 wherein the stem defines a cavity and the electrically powered air compressor is disposed in the cavity.

11. The bicycle as set forth in claim 9 wherein the stem presents a distal end spaced from the saddle and received by the seat post, the electrical connector of the stem being disposed at the distal end.

12. The bicycle as set forth in claim 9 wherein the stem and the seat post each support a connector configured to fluidly couple the electrically powered air compressor with additional components of the bicycle.

13. The bicycle as set forth in claim 9 wherein the electrically powered air compressor is a scroll compressor.

14. The bicycle as set forth in claim 9 further comprising a valve in communication with the bladder for selectively releasing air from the bladder.

15. The bicycle as set forth in claim 9 further comprising a second bladder separate from the first bladder and in fluid communication with the electrically powered air compressor.

16. The bicycle as set forth in claim 15 further comprising a valve in fluid communication with the bladder and a second valve in fluid communication with the second bladder for releasing air independently from the bladder and the second bladder.

17. The bicycle as set forth in claim 9 wherein the stem is configured to removably engage the seat post.

18. The bicycle as set forth in claim 9 further comprising additional components and wherein the stem and the seat post each support a connector fluidly coupling the electrically powered air compressor and the additional components when the stem is engaged with the seat post.

19. A bicycle comprising:
a frame including a seat post;
a battery on the frame;
a seat including a stem configured to engage the seat post, a saddle supported by the stem, and an inflatable bladder supported by the saddle;
the seat including an electrically powered air compressor supported by the stem, the electrically powered air compressor being electrically coupled to the battery and in fluid communication with the bladder for inflating the bladder;
wherein the stem includes an electrical connector in communication with the electrically powered air compressor, and the seat post includes an electrical connector in communication with the battery, the electrical connectors being electrically connected to each other when the stem is engaged with the seat post.

20. The bicycle as set forth in claim 19, wherein the stem defines a cavity and the electrically powered air compressor is disposed in the cavity.

* * * * *